United States Patent Office 3,343,458
Patented Sept. 26, 1967

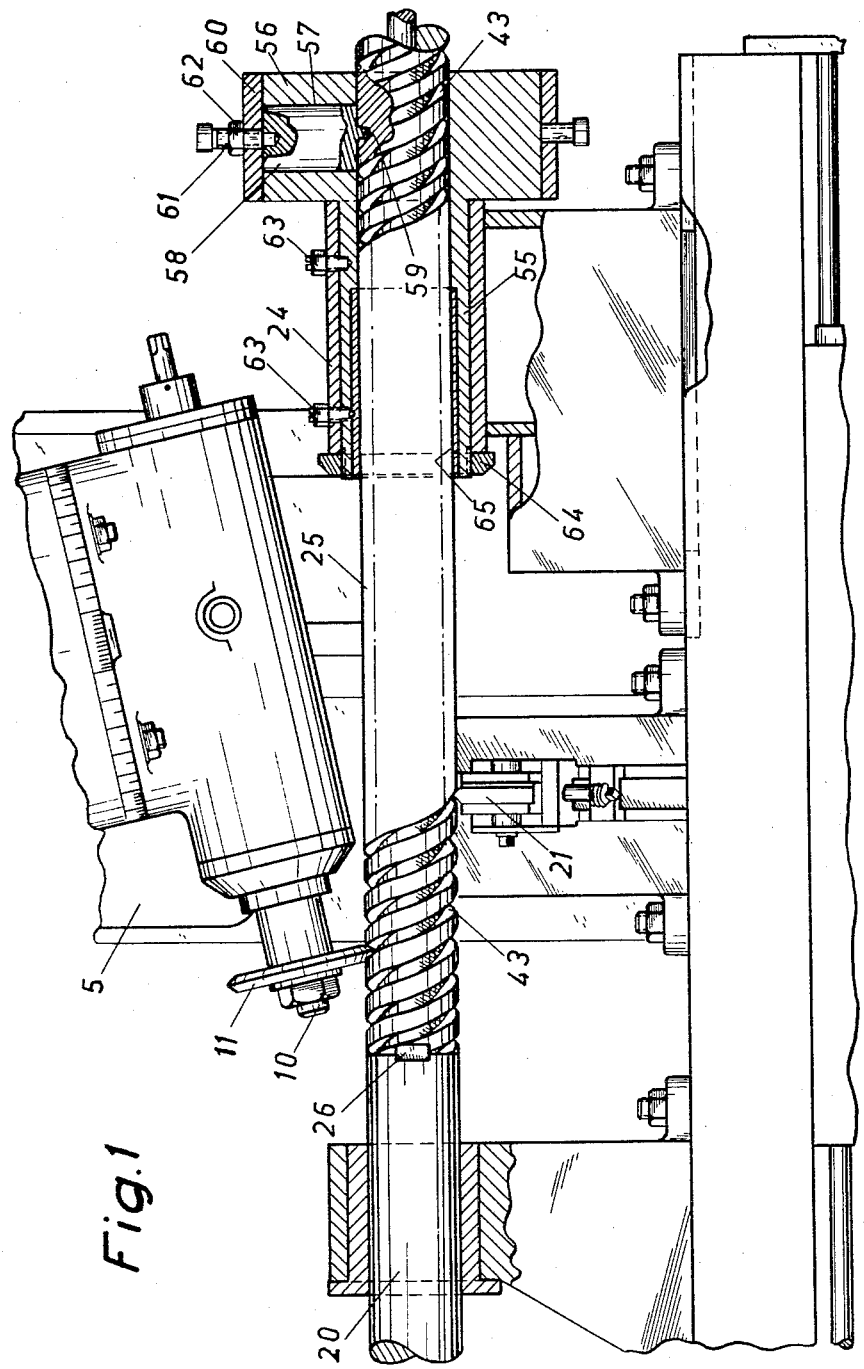

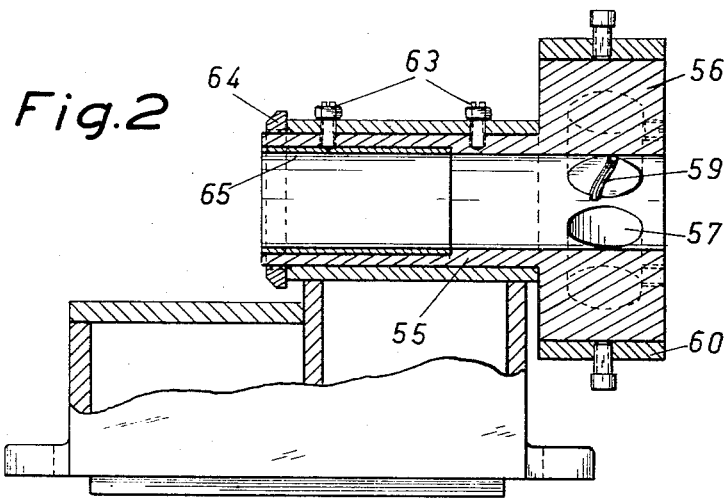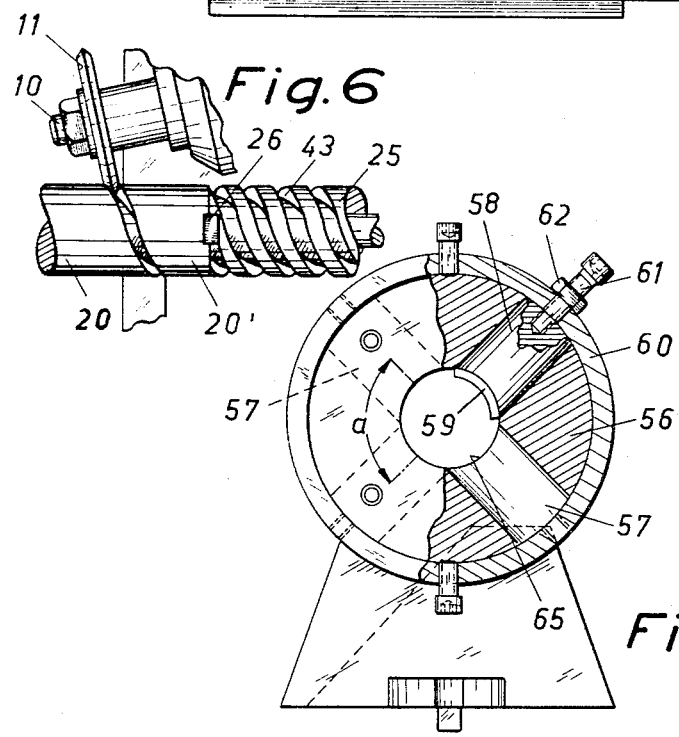

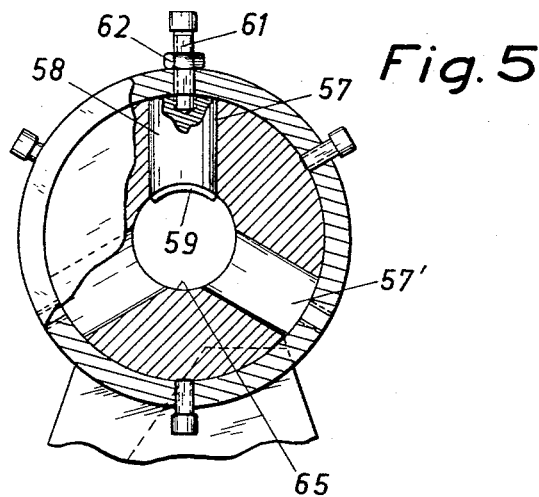
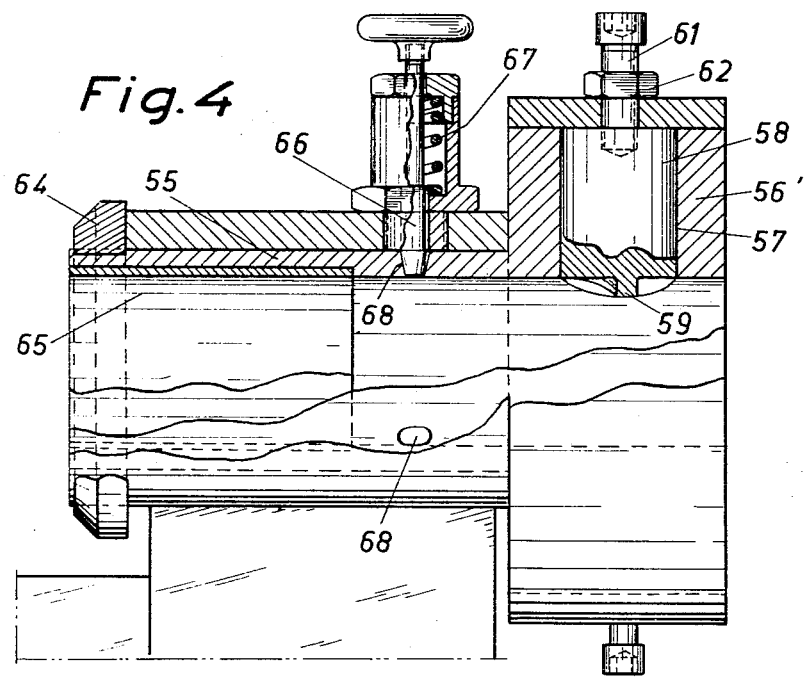

3,343,458
METHOD AND A MACHINE TOOL FOR CUTTING AND/OR TREATING THREADS OF ROD-SHAPED WORK PIECES
Bertil Ivar Torsten Larsson, Bredaryd, Sweden, assignor to Aktiebolaget Sigfried Stenberg, Nassjo, Sweden, a corporation of Sweden
Filed Oct. 5, 1965, Ser. No. 493,074
Claims priority, application Sweden, Oct. 23, 1964, 12,781/64
4 Claims. (Cl. 90—11.62)

In my copending patent application No. 276,636, now Patent No. 3,221,607, there is described a method for cutting or treating threads of a rod-shaped work piece in a machine tool with a chip cutting tool, whereas the work piece together with a guide screw, arranged axially in relation to the work piece, during rotation and axial displacement is moved to pass by the cutting tool, the latter engaging the surface of the work piece, said tool adapted to engage first the thread of the guide screw, this screw passing through a guiding nut being stationary during the operation and arranged on the machine so as, during the displacement of the work piece closer to the nut, to engage the nut whereupon the work piece itself when it is provided with threads and reaches and enters the nut, serves as a guiding screw. By means of this method it is possible to manufacture screw spindles with only one entrance.

The present invention has reference to a method by means of which it is possible easily to manufacture screw spindles with two or three or even more entrances. The main feature of the invention is to be seen therein that at the cutting of threads with more than one entrance the rotation of the work piece is guided during the cutting or the treatment of the threads for each entrance by its special screw thread in said nut.

The invention has reference also to a machine tool for carrying this method into effect.

The invention will now be elucidated with reference had to the accompanying partly diagrammatical drawings which are intended merely to illustrate the invention but not to restrict it. In the drawings:

FIG. 1 is a front elevation shown partly in longitudinal section and illustrating the portions of the machine tool in the vicinity of which the cutting work proper is carried out, FIG. 2 shows a longitudinal section through the lathe-head of the machine carrying the guiding nut, FIG. 3 is an end elevation shown in partial cross section of the nut and its lathe-head, FIG. 4 is a longitudinal section similar to the one in FIG. 2 but illustrating another embodiment of the nut, FIG. 5 is an end elevation shown in a partial cross section of this nut, and FIG. 6 is a side elevation of the connection point between the guide screw and the work piece in which the first entrance of the thread is cut.

In the drawings corresponding details have been denoted with the same reference letters as in the copending application.

The cutter shown in FIG. 1 corresponds to its essential parts to the cutter shown in the main patent with exception of the shape of the guide nut. In the nut housing 24 there is adapted to be axially inserted the hub 55 of a nut head 56 with a number of radial bores 57 and in each one of these bores there is adapted to be inserted an inset piece 58. At their radially inner ends the inset pieces are provided with a thread cam 59 adapted to engage the thread 43 in the guide screw 25. About and outside the nut head 56 there is arranged a retaining ring 60 having a set screw 61 with a counter nut 62 situated in front of the outer end of each inset piece 58. The nut housing 24 is provided with two locking screws 63 by means of which the hub 55 and the nut head 56 may be retained in adjusted position in relation to the nut housing. The hub 55 is further at the end situated opposite the head 56 provided with a tightening nut 64.

The guide nut is manufactured preferably in the following manner. The nut head 56 with the inset pieces 58 in the same, the inner ends of said pieces 58 extending axially into the bore in the hub and the nut head a length which corresponds to the depth of the thread to be manufactured, are clamped in a lathe chuck and the inner ends of the inset pieces 58 are here provided with a screw thread in correspondence to the thread to be cut in the work piece 20. Thereupon all thread cams 59 but one are cut away on the inset piece 58. The remaining thread cam 59 is intended to guide its entrance of the thread to be cut in the work piece 20.

The guide screw 25 shown in FIG. 1 and the guiding nut are intended to be used for cutting a thread with three entrances in the work piece 20.

Upon the coupling of the work piece 20 to the guide screw 25 and, after having been passed through the bore 65 in the hub 55 and the nut head 56, this screw in its turn to the gear box of the machine, the work spindle 10 with the cutter 11 is adjusted in such a way that it engages the first entrance of the screw thread 43 near the coupling device 26 between the work piece 20 and the guide screw 25. When thereupon the motors (not shown) of the machine are started, the guide screw 25 is screwed through the nut housing 24 to the right according to FIG. 1 due to the engagement of the guiding thread cam 59 in said entrance of the screw thread 43 while bringing along the work piece 20 whereby by means of the cutter 11 a screw thread is cut in the work piece. A part of the first entrance of the screw thread is shown in FIG. 6. In case any burrs should remain, they could be removed by means of the deburring tool 21. The machine may be provided with a flush chamber in which the screw threads cut in the work piece are washed clean before reaching the nut housing 24. The work piece 20 provided with the screw thread serves, before entering into the nut housing 24, as a guide screw during the continued cutting work. For the reason that the first inset piece 58 with its guiding cam 59 engages the bore 65 in the nut housing 56, there is nothing preventing the portion 20' (FIG. 6) of the work piece 20 not yet cut from passing through the nut housing.

When the first entrance has been cut of the screw thread in the work piece 20, the screw 61 is loosened, the retaining ring 60 is displaced axially and the inset piece 58 is removed. Upon a small lifting of the lathe head with the cutter spindle 10 in such a way that the cutter 11 leaves the thread 43, the work piece 20 with the guide screw 25 is displaced axially to the left to the start position shown in FIG. 1. The next inset piece is inserted in the adjacent bore, e.g. the bore denoted with 57', and the guide screw is thereupon turned together with the work piece 120° so that the thread cam on the next inset piece can engage in the second entrance of the screw thread 43. The lathe head 5 with the cutter 11 is again lowered to operative position and the course of events is repeated in the way described in the aforegoing whereby the second entrance of the screw thread is cut in the work piece 20. In this manner the operation is continued until all three entrances of the screw thread have been cut in the work piece 20.

When a work piece is to be provided with a screw thread having four entrances, there is used a guiding nut with a nut head according to FIGS. 2 and 3, i.e. with four radial bores 57 with a mutual angle distance of 90°. In each one of these bores 57 there may be inserted an inset piece 58 with the thread cam 59 serving for the guidance of the guiding screw 25 in one by one of the entrances of this thread 43.

By means of the nut head 56 shown in FIGS. 2 and 3 it is also possible to cut a thread with only two entrances whereas there are used only two of the bores 57 in the nut head 56 situated opposite each other for housing each their inset piece 58.

According to the embodiments described in the aforegoing concerning the guiding nut, the nut head is retained during the whole of the operation by means of the screws 63 and the tightening nut 64. However, in FIG. 4 there is shown one embodiment of the invention according to which the nut head 56' is provided with only one bore 57 and only one inset piece 58. In this case the nut head 56 with its hub 55 is adapted to be turned an angle distance corresponding to the number of entrances of the screw thread to be cut in the work piece 20. Consequently, it will be turned 120° in case the work piece is to be provided with a screw thread with three entrances. So as to retain the nut head 56' in the different angle positions there is arranged a lock plunger 66 which by means of the action of a spring is brought to engage one of a number of radial bores 68 in the hub 55 according to the chosen embodiment with a mutual angle distance of 120°. It is obvious that in case a screw thread with e.g. four entrances is to be cut in the work piece 20, there must be arranged four bores 68 having equal distances *a* in the hub 55.

After the cutting of one entrance of the screw threads in the work piece 20, the nut head 56' is turned one step and when the work piece 20 has been returned to the original position the cutting of the next entrance can be carried into effect.

The invention has been described in the aforegoing for the purposes of illustration only and it is not intended to be limited by this description or otherwise except as defined in the appended claims. Thus, the inset pieces 58 with their guiding cam 59 do not necessarily have to be arranged in a nut head 56 in such a way that they be situated radially in the nut head. It is namely possible instead to arrange the inset pieces 58 one beside the other along a straight line or a helical line in such a way that their inner ends engage the bore 65 in the hub 55 or the nut head 56. It is thereby of essential importance only that the thread cam 59 on the inset piece 58 can be brought to engage the respective thread entrance when the guide screw 25 has been turned the intended angle distance.

In the aforegoing it has been stated that a separate guide screw 25 is used. This is particularly suitable when a number of screw spindles of one and the same kind are to be manufactured (i.e. with the same dimensions and with the same kind of threads and with the same number of entrances of the thread). However, in case only one or some few and long screw spindles with a rather great diameter is to be manufactured, it might be more suitable in e.g. a lathe to cut first the thread in one end of the working piece over a length which corresponds to the length of the guide screw 25 according to FIG. 1 and thereupon to let this thread, cut directly in one end of the working piece, serve as a guide screw thread at the subsequent thread cutting by means of the cutter 11 in the machine according to the invention. The method according to the invention could with the same advantage be used at the grinding of screw threads with many entrances in which case the cutter 11 of course has to be replaced by a grinding disk.

What I claim is:

1. A machine tool for cutting and treating threads of a rod shaped work piece, said machine provided with a driven cutting tool, a nut being adjustable relative to said tool and passed through by a driven guide screw at one end of a rod-shaped work piece, means adapted, during rotation, to move said work piece, after it has been provided with threads by means of said cutting tool, axially through said nut so that said work piece thereupon may serve as a guide screw, said nut shaped as a head carried in a lathe head of the machine tool, said head adapted to be passed through by the work piece and being provided with at least one inset piece adapted to be inserted radially into said head, said inset being at the radially inner end provided with a thread cam adapted to engage and guide the thread entrance of the thread of the work piece being actually treated.

2. A machine tool for cutting and treating threads of a rod-shaped work piece, said machine provided with a driven cutting tool, a nut being adjustable relative to said tool and passed through by a driven guide screw at one end of a rod-shaped work piece, means adapted, during the rotation, to move said work piece, after it has been provided with threads by means of said cutting tool, axially through said nut so that said work piece thereupon may serve as a guide screw, said nut shaped as a head carried in a lathe head of the machine tool, said head adapted to be passed through by the work piece and being provided with one inset piece adapted to be inserted radially into said head, said inset being at the radially inner end provided with a thread cam adapted to engage and guide the thread entrance of the thread of the work piece being actually treated, said head being rotatable and adjustable in different angle positions corresponding to the number of entrances of the screw threads of said work piece.

3. A machine tool for cutting and treating threads of a rod-shaped work piece, said machine provided with a driven cutting tool, a nut being adjustable relative to said tool and passed through by a driven guide screw at one end of a rod-shaped work piece, means adapted, during rotation, to move said work piece, after it has been provided with threads by means of said cutting tool, axially through said nut so that said work piece thereupon may serve as a guide screw, said nut shaped as a head carried in a lathe head of the machine tool, said head adapted to be passed through by the work piece and being provided with at least one inset piece adapted to be inserted radially into said head, said inset being at the radially inner end provided with a thread cam adapted to engage and guide the thread entrance of the thread of the work piece being actually treated, said head being non-rotatable in the lathe head and provided with a number of inset pieces corresponding to the number of entrances of the threads of the work piece to be treated, said inset pieces arranged with equal distances in said head and being each one provided with a guiding cam.

4. A machine tool for cutting and treating threads of a rod-shaped work piece, said machine provided with a driven cutting tool, a nut being adjustable relative to said tool and passed through by a driven guide screw with a device for its axial coupling to a rod-shaped work piece, means adapted, during rotation, to move said work piece, after it has been provided with threads by means of said cutting tool, axially through said nut so that said work piece thereupon may serve as a guide screw, said nut shaped as a head carried in a lathe head of the machine tool, said head adapted to be passed through by the work piece and being provided with at least one inset piece adapted to be inserted radially into said head, said inset being at the radially inner end provided with a thread cam adapted to engage and guide the thread entrance of the thread of the work piece being actually treated.

References Cited

FOREIGN PATENTS 373,817    4/1923    Germany.

WILLIAM W. DYER, *Primary Examiner.*

G. A. DOST, *Assistant Examiner.*